United States Patent
Arai et al.

(10) Patent No.: US 10,066,111 B2
(45) Date of Patent: *Sep. 4, 2018

(54) AQUEOUS INKJET INK FOR HUMIDITY-CONDITIONING BASE MATERIAL AND METHOD FOR PRODUCING DECORATED HUMIDITY-CONDITIONING BASE MATERIAL

(71) Applicant: RISO KAGAKU CORPORATION, Tokyo (JP)

(72) Inventors: Sayako Arai, Ibaraki (JP); Hirotaka Yamamoto, Ibaraki (JE); Ami Terakado, Ibaraki (JP); Shinji Tabuchi, Ibaraki (JP); Yoshihisa Morita, Ibaraki (JE)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/093,544

(22) Filed: Apr. 7, 2016

(65) Prior Publication Data

US 2016/0319142 A1    Nov. 3, 2016

(30) Foreign Application Priority Data

Apr. 30, 2015 (JP) ................. 2015-093362

(51) Int. Cl.
| | |
|---|---|
| B41J 2/01 | (2006.01) |
| C09D 11/033 | (2014.01) |
| C09D 11/102 | (2014.01) |
| C09D 11/107 | (2014.01) |
| C09D 11/30 | (2014.01) |
| C09D 11/106 | (2014.01) |
| C09D 11/54 | (2014.01) |

(52) U.S. Cl.
CPC ............... C09D 11/30 (2013.01); B41J 2/01 (2013.01); C09D 11/033 (2013.01); C09D 11/102 (2013.01); C09D 11/106 (2013.01); C09D 11/107 (2013.01); C09D 11/54 (2013.01)

(58) Field of Classification Search
CPC ... C09D 11/102; C09D 11/033; C09D 11/106; C09D 11/107; C09D 11/30; C09D 11/54; B41J 2/01
See application file for complete search history.

(56) References Cited

U.S. PATENT DOCUMENTS

| 5,984,466 | A | 11/1999 | Nagashima et al. |
|---|---|---|---|
| 2003/0010258 | A1 | 1/2003 | Fukuda |
| 2003/0179269 | A1 | 9/2003 | Yamanouchi et al. |
| 2007/0052785 | A1 | 3/2007 | Itoh et al. |
| 2008/0282932 | A1 | 11/2008 | Kiyomoto et al. |
| 2009/0182098 | A1 | 7/2009 | Sano et al. |
| 2010/0196601 | A1 | 8/2010 | Goto et al. |
| 2010/0277541 | A1 | 11/2010 | Watanabe et al. |
| 2011/0164086 | A1 | 7/2011 | Goto et al. |
| 2012/0232203 | A1 | 9/2012 | Tomura et al. |
| 2013/0053485 | A1 | 2/2013 | Misawa et al. |
| 2014/0139595 | A1 | 5/2014 | Hong et al. |
| 2015/0017402 | A1 | 1/2015 | Suzuki et al. |
| 2015/0105504 | A1 | 4/2015 | Verheggen et al. |
| 2016/0229177 | A1* | 8/2016 | Yamamoto ................. B41J 2/01 |

FOREIGN PATENT DOCUMENTS

| CN | 1736935 A | 2/2006 |
|---|---|---|
| EP | 1759858 A1 * | 3/2007 |
| JP | 6-344654 A | 12/1994 |
| JP | 2002-004447 | 1/2002 |
| JP | 2002-154864 | 5/2002 |
| JP | 2003-146775 | 5/2003 |
| JP | 2006-192587 A | 7/2006 |
| JP | 2007044614 | 2/2007 |
| JP | 2011-026871 | 2/2011 |
| WO | 02/100652 | 12/2002 |
| WO | 2012170036 | 12/2012 |
| WO | 2013/129523 | 9/2013 |
| WO | 2013/131924 | 9/2013 |
| WO | 2013/189746 | 12/2013 |
| WO | 2014135843 | 9/2014 |
| WO | 2014147373 | 9/2014 |
| WO | 2015080246 | 6/2015 |
| WO | 2015115600 | 8/2015 |

OTHER PUBLICATIONS

Extended European Search Report, dated Jul. 5, 2016, European Patent Application 16163505.7 (8 pages).
International Search Report for PCT/JP2014/081543, dated Mar. 3, 2015, and English translation thereof, 5 pages total.
Japanese Office Action dated Nov. 4, 2014 in JP application No. 2014-198206, 2 pages total.
Japanese Office Action dated Jan. 6, 2015 in JP application No. 2014-198206, 3 pages total.
English Translation of the International Preliminary Report on Patentability for PCT/JP2014/081543, dated Jun. 9, 2016 (9 pages).
Chinese Office Action, Chinese Patent Application No. 201480056405.5, dated Dec. 12, 2016.
Extended European Search Report, European Patent Application No. 14865517.8, dated May 30, 2017 (9 pages).
Extended European Search Report, dated May 27, 2016; European Patent Application No. 16163504.0 (9 pages).

* cited by examiner

Primary Examiner — Irina S Zemel
Assistant Examiner — Jeffrey S Lenihan
(74) Attorney, Agent, or Firm — Hamre, Schumann, Mueller & Larson, P.C.

(57) ABSTRACT

Disclosed is an aqueous inkjet ink for a humidity-conditioning base material, the ink comprising at least a colorant, a water-dispersible resin and water, and the water-dispersible resin comprising at least one water-dispersible urethane resin and at least one water-dispersible (meth)acrylic resin or water-dispersible styrene/(meth)acrylic resin.

13 Claims, No Drawings

AQUEOUS INKJET INK FOR HUMIDITY-CONDITIONING BASE MATERIAL AND METHOD FOR PRODUCING DECORATED HUMIDITY-CONDITIONING BASE MATERIAL

CROSS REFERENCE TO RELATED APPLICATIONS

This Application is based upon and claims the benefit of priority from prior Japanese Application 2015-093362 filed on Apr. 30, 2015; the entire contents of which are incorporated by reference herein.

BACKGROUND OF THE INVENTION

Technical Field

Embodiments of the present invention relate to an aqueous inkjet ink for "a humidity-conditioning base material" or "a humidity-conditioning material" that is used for decorating the humidity-conditioning base material, and a method for producing a decorated humidity-conditioning base material using the ink.

Background Art

Humidity-conditioning construction materials (humidity-conditioning base materials) are fabricated from porous materials, and therefore have a multitude of pores in their surfaces, and because these pores exhibit moisture adsorption and desorption properties, these construction materials have the ability to control the humidity within a target space such as an indoor room.

Under the humidity-conditioning construction material certification system, humidity-conditioning construction materials which satisfy certain humidity-conditioning properties and other conditions prescribed in humidity-conditioning construction material standards (Japan Construction Material & Housing Equipment Industries Federation, "Humidity-conditioning construction material standards relating to the humidity-conditioning construction material registration and certification system", established Oct. 1, 2007, revised Apr. 1, 2012, Internet URL: http://www.ken-sankyo.org/nintei/tyousitu/tyousitu_top.html) can be registered with the Japan Construction Material & Housing Equipment Industries Federation, and a special humidity-conditioning construction material mark can be displayed on registered humidity-conditioning construction materials as a guarantee of quality. Within these humidity-conditioning construction material standards, the registration conditions relating to the humidity-conditioning properties require that the material clears prescribed levels for the amount of moisture adsorption and desorption (JIS A 1470-1:2002, Determination of water vapor adsorption/desorption properties for building materials—Part 1: Response to humidity variation—method for testing water vapor adsorption/desorption upon humidity variation) and the equilibrium moisture content (namely, the moisture content gradient and the average equilibrium moisture content) (JIS A 1475:2004, Method of test for hygroscopic sorption properties of building materials).

Further, in humidity-conditioning performance evaluation standards for humidity-conditioning construction materials compiled in March 2006 by the Humidity-Conditioning Construction Materials Performance Evaluation Committee (Humidity-Conditioning Construction Materials Performance Evaluation Committee, "Humidity-conditioning performance evaluation standards for humidity-conditioning construction materials", March 2006, Internet URL: http://www.jtccm.or.jp/main_services/seino/seino_jigyou_cyositu.html), humidity-conditioning construction materials are classified into three grades shown below in Table 1 on the basis of the aforementioned amount of moisture adsorption and desorption and the equilibrium moisture content. Grade 1 describes a material that satisfies the minimum level of performance required for a humidity-conditioning construction material, grade 3 describes a material having excellent performance as a humidity-conditioning construction material, and grade 2 describes a material having performance midway between grade 1 and grade 3. These humidity-conditioning performance evaluation standards for humidity-conditioning construction materials are listed on the website of the Japan Testing Center for Construction Materials (http://www.jtccm.or.jp/main_services/seino/seino_jigyou_cyositu.html). In the case of the moisture adsorption and desorption properties, the standards stipulate that the amount of moisture adsorption at a relative humidity of 50 to 75% should exceed the numerical value shown below in Table 1, and the amount of moisture desorption after 12 hours should be about 70% or more of the amount of moisture adsorption over 12 hours, whereas in the case of the equilibrium moisture content, the standards stipulate that the value for the equilibrium moisture content in the moisture adsorption process (the moisture content mass by volume) should exceed the numerical value shown below in Table 1.

TABLE 1

| JIS A 1470-1 (Amount of moisture adsorption g/m$^2$) | | | |
|---|---|---|---|
| Amount of moisture adsorption | 3 hours | 6 hours | 12 hours |
| Grade 3 | 36 | 50 | 71 |
| Grade 2 | 25 | 35 | 50 |
| Grade 1 | 15 | 20 | 29 |

| JIS A 1475 (Moisture content gradient $\Delta\psi$ (kg/m$^3$/%), average equilibrium moisture content $\psi$ (kg/m$^3$)) | | |
|---|---|---|
| Equilibrium moisture content | Moisture content gradient | Average equilibrium moisture content |
| Grade 3 | 0.4 | 18 |
| Grade 2 | 0.26 | 11 |
| Grade 1 | 0.12 | 5 |

(Note)
Average equilibrium moisture content describes the value at a relative humidity of 55%

Known humidity-conditioning construction materials include materials fabricated from all manner of porous materials, and examples of humidity-conditioning construction materials containing an unexpanded vermiculite blended with calcium silicate include MOISS (a product name) manufactured by Mitsubishi Materials Kenzai Corporation, SARARIART (a product name) manufactured by Daiken Corporation, ECOCARAT (a product name) manufactured by LIXIL Corporation (Inax), AG PLUS (a product name) manufactured by Nagoya Mosaic-Tile Co., Ltd., GAUDIA (a product name) manufactured by Sekisui Board Co., Ltd., and MONSIEUR (a product name) manufactured by Nikko Company.

In those cases where a humidity-conditioning construction material is used as an interior material, it is desirable that the surface of the humidity-conditioning construction material is decorated to enhance the decorative design characteristics, and a number of methods for decorating humidity-conditioning construction materials have already been proposed.

JP 2003-146775 A (Patent Document 1) discloses a technique for obtaining a construction material with excellent design characteristics by subjecting the surface of a humidity-conditioning construction material obtained by blending an unexpanded vermiculite with calcium silicate to a baking treatment.

JP 2011-26871 A (Patent Document 2) discloses a technique for forming an image on the surface of a humidity-conditioning construction material using an inkjet method and a UV-curable ink.

SUMMARY OF THE INVENTION

Objects of embodiments of the present invention are to provide an aqueous inkjet ink for a humidity-conditioning base material which, even when printed by inkjet printing, can form a high-quality image with excellent water abrasion resistance and high gloss on the surface of a humidity-conditioning base material that can be used in a humidity-conditioning construction material or the like, without impairing the humidity-conditioning performance, and also to provide a method for producing a decorated humidity-conditioning base material using this aqueous inkjet ink.

One embodiment of the present invention provides an aqueous inkjet ink for a humidity-conditioning base material, the ink comprising at least a colorant, a water-dispersible resin and water, and the water-dispersible resin comprising at least one water-dispersible urethane resin and at least one water-dispersible (meth)acrylic resin or water-dispersible styrene/(meth)acrylic resin.

Another embodiment of the present invention provides a method for producing a decorated humidity-conditioning base material comprising a step of performing inkjet printing onto a surface of a humidity-conditioning base material using the aqueous inkjet ink for a humidity-conditioning base material according to the embodiment above.

Yet another embodiment of the present invention provides a decorated humidity-conditioning base material comprising a decorative portion formed using the aqueous inkjet ink for a humidity-conditioning base material according to the embodiment above, having an amount of moisture adsorption, measured after 3 hours in accordance with JIS A 1470-1 (2002), of greater than 15 g/m$^2$.

EMBODIMENTS FOR CARRYING OUT THE INVENTION

Embodiments of the present invention are described below in detail, but the present invention is in no way limited by these embodiments, and various modifications and alterations are possible.

The technique of Patent Document 1 requires the surface of the humidity-conditioning construction material to be heated at a high temperature during the baking treatment, and as a result, it is thought that some components contained within the construction material may undergo carbonization and turn black, meaning the color range of the product is narrow, with colorants having low tinting strength and covering power tending to darken, and therefore achieving a full-color image becomes difficult. Further, in the technique of Patent Document 1, the particle size of the colorants is large (from several thousand nm to several mm), and because it is considered that large amounts of colorants must be added, it is thought that the colorants may block a large number of pores, causing a significant deterioration in the humidity-conditioning performance.

In the technique of Patent Document 2, those portions to which the UV ink has been adhered suffer from reduced humidity-conditioning performance, and therefore the surface area of the image must be restricted to not more than ⅓ of the total surface area of the base material. A plurality of the humidity-conditioning construction material panels are usually installed, but if there is a limit on the printing surface area, then generating a pattern that spans a plurality of the humidity-conditioning construction material panels is extremely difficult. Moreover, there is a possibility that uncured UV ink may remain within the interior of the humidity-conditioning construction material, and therefore safety issues arise in relation to use of the material as an interior material, and potential adverse effects on people are also a concern. Moreover, humidity-conditioning construction materials may be used not only as construction materials, but also as coasters or foot mats or the like, and it is desirable that the image portion of these materials has water abrasion resistance of a level that presents no practical problems.

In contrast, embodiments of the present invention are able to provide an aqueous inkjet ink for a humidity-conditioning base material which, even when printed by inkjet printing, can form a high-quality image with excellent water abrasion resistance and high gloss on the surface of a humidity-conditioning base material that can be used in a humidity-conditioning construction material or the like, without impairing the humidity-conditioning performance, and also provide a method for producing a decorated humidity-conditioning base material using this aqueous inkjet ink.

1. Aqueous Inkjet Ink for Humidity-Conditioning Base Material

The aqueous inkjet ink for a humidity-conditioning base material comprises at least a colorant, a water-dispersible resin and water, in which the water-dispersible resin comprises at least one water-dispersible urethane resin and at least one water-dispersible (meth)acrylic resin or water-dispersible styrene/(meth)acrylic resin.

Each of the components of the aqueous inkjet ink for a humidity-conditioning base material according to this embodiment (hereafter also referred to as simply "the ink") is described below in detail. The humidity-conditioning base material that represents the printing target for the ink of the present embodiment is described in the following section relating to a method for producing a decorated humidity-conditioning base material.

In addition, the ink according to another embodiment can be used in combination with a specific pretreatment liquid, the details of which are described in the following section.

(1) Colorant

Both pigments and dyes can be used as the colorant, and the pigments and dyes may be used separately, or the two may be combined. From the viewpoints of the weather resistance and print density of the image, a pigment is preferably used as the colorant.

The amount of the colorant is preferably within a range from 0.01 to 20% by mass relative to the total mass of the ink. Further, the amount of the colorant relative to the total mass of the ink is more preferably at least 0.1% by mass, still more preferably at least 0.5% by mass, and most preferably 1% by mass or greater. Moreover, the amount of the colorant relative to the total mass of the ink is more preferably not more than 15% by mass, still more preferably not more than 10% by mass, and most preferably 8% by mass or less.

[Dyes]

Any of the dyes typically used in the technical field of printing may be used without any particular limitations. Specific examples include basic dyes, acid dyes, direct dyes, soluble vat dyes, acid mordant dyes, mordant dyes, reactive dyes, vat dyes and sulfide dyes, and among these, water-soluble dyes and dyes that become soluble upon reduction or the like can be used. More specific examples of dyes that may be used include azo dyes, rhodamine dyes, methine dyes, azomethine dyes, xanthene dyes, quinone dyes, triphenylmethane dyes, diphenylmethane dyes, and methylene blue. These dyes may be used individually, or a combination of two or more dyes may be used.

[Pigments]

Examples of pigments that may be used include organic pigments such as azo pigments, phthalocyanine pigments, polycyclic pigments and dye lake pigments, as well as inorganic pigments. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Representative examples of the inorganic pigments include carbon black and titanium oxide. These pigments may be used individually, or a combination of two or more pigments may be used.

[Pigment Dispersant]

In order to improve the dispersion of the pigment within the ink, a pigment dispersant may be added to the ink as necessary. There are no particular limitations on the types of pigment dispersants that may be used, provided they are capable of stably dispersing the pigment within the solvent, and the use of conventional pigment dispersants typified by polymeric dispersants and surfactants is preferable. Specific examples of the polymeric dispersants include the SOLSPERSE (product name) series manufactured by Lubrizol Japan Ltd., and the JONCRYL (product name) series manufactured by Johnson Polymer, Inc. Specific examples of the surfactants include the DEMOL (product name) series manufactured by Kao Corporation.

The amount of the pigment dispersant need only be sufficient to enable satisfactory dispersion of the pigment within the solvent, and can typically be set to a mass ratio within a range from 0.01 to 2 relative to a value of 1 for the pigment.

(2) Water-Dispersible Resin

In order to ensure satisfactory fixation of the colorant to the humidity-conditioning base material, the ink of the present embodiment includes a water-dispersible resin. Further, in the ink of the present embodiment, the water-dispersible resin contains a water-dispersible urethane resin, and a water-dispersible (meth)acrylic resin or water-dispersible styrene/(meth)acrylic resin. A resin that forms a transparent coating is preferably used as the water-dispersible resin. Further, resins that can form particles within the aqueous ink, namely resins that can form oil-in-water (O/W) resin emulsions, are preferable, and these resins can be added as resin emulsions. In the ink of the present embodiment, including a water-dispersible urethane resin mainly yields an image having excellent flexibility, whereas including a water-dispersible (meth)acrylic resin or water-dispersible styrene/(meth)acrylic resin mainly yields an image having excellent gloss. In other words, because the ink of the present embodiment includes both of these water-dispersible resins, when the ink is inkjet printed onto a humidity-conditioning base material, an image having excellent flexibility and gloss can be obtained.

[Water-Dispersible Urethane Resin]

The humidity-conditioning base material that represents the printing target for the ink has a multitude of pores in the surface, and these pores exhibit moisture adsorption and desorption properties. The diameters of the pores having this humidity-conditioning function in the humidity-conditioning base material are typically from about 1 to 100 nm, and more specifically, typically include mesopores having a diameter of about 1 to 50 nm and macropores having a diameter greater than about 50 nm but not more than about 100 nm. If these pores become blocked by the ink, then the humidity-conditioning performance may sometimes deteriorate. Accordingly, in the present embodiment, in order to prevent any deterioration in the humidity-conditioning performance, the median size of the water-dispersible urethane resin particles is preferably from 10 to 200 nm. Unless particularly stated otherwise, the median size of the water-dispersible resin refers to a volume-based particle size (median value) in a particle size distribution measured using a dynamic light scattering method. Measurements may be performed at 25° C., using an apparatus such as the nanoparticle analyzer nano Partica SZ-100 (manufactured by Horiba, Ltd.) as the dynamic light scattering particle size distribution measuring apparatus, with the water-dispersible resin diluted with water to a concentration of 0.5% by mass.

The types of water-dispersible resin emulsions used in conventional inkjet inks and the like can be used as the water-dispersible urethane resin. Specific examples include the products SUPERFLEX 420, 460, 460S and 470 (carbonate-based urethane resin emulsions), 150HS (an ester-ether-based urethane resin emulsion), and 740 and 840 (aromatic isocyanate-based ester-based urethane resin emulsions) manufactured by DKS Co., Ltd., and the products NeoRez R-9660 and R-2170 (aliphatic polyester-based urethane resin emulsions), NeoRez R-966, R-967 and R-650 (aliphatic polyether-based urethane resin emulsions) and R-986 and R-9603 (aliphatic polycarbonates) manufactured by DSM N.V.

[Water-Dispersible (Meth)Acrylic Resin or Water-Dispersible Styrene/(Meth)Acrylic Resin]

If only the water-dispersible urethane resin is used in the ink, then the water-dispersible resin tends to be prone to aggregation, and the effects of changes in the temperature of the storage environment, or contamination of the ink with impurities or the like can lead to the formation of coarse foreign matter due to aggregation between resin particles or fusion of particles that also incorporates the colorant. This can cause a deterioration in the quality of the printed image due to a decrease in the viscosity of the ink, or the foreign matter may adhere or accumulate inside the inkjet head and cause discharge faults. Accordingly, in the ink of the present embodiment, by also including a water-dispersible (meth)acrylic resin or water-dispersible styrene/(meth)acrylic resin in addition to the water-dispersible urethane resin, any decrease in the ink viscosity can be suppressed, and a printed article having high gloss can be obtained. In this description, the term "(meth)acrylic resin" includes both acrylic resins and methacrylic resins.

The water-dispersible styrene/(meth)acrylic resin is a copolymer of styrene and (meth)acrylic acid or a derivative thereof. The copolymerization ratio of both monomers is not particularly limited, but is preferably, reported as a mass ratio between styrene component and (meth) acrylic component, within a range from 1 (styrene component): 0.1 ((meth) acrylic component) to 1:10.

From the viewpoint of preventing discharge faults within the inkjet head, the median size of the water-dispersible (meth)acrylic resin or water-dispersible styrene/(meth) acrylic resin is preferably from 10 to 200 nm.

The types of water-dispersible resin emulsions used in conventional inkjet inks and the like can be used as the water-dispersible (meth)acrylic resin or water-dispersible styrene/(meth)acrylic resin. Specific examples include the products MOWINYL 966A, 6963 and 6960 (acrylic resin emulsions) and MOWINYL 6969D and RA-033A4 (styrene/acrylic resin emulsions) manufactured by The Nippon Synthetic Chemical Industry Co., Ltd., the products JONCRYL 7100, PDX-7370 and PDX-7341 (styrene/acrylic resin emulsions) manufactured by BASF Corporation, and the products VONCOAT EC-905EF, 5400EF and CG-8400 (acrylic/styrene-based emulsions) manufactured by DIC Corporation.

The amount of the water-dispersible (meth)acrylic resin or water-dispersible styrene/(meth)acrylic resin in the ink preferably represents 20 to 90% by mass, and more preferably 40 to 80% by mass, of the total mass of water-dispersible resins. By ensuring that this amount is from 20 to 90% by mass, both the suppression of reduction in the ink viscosity and the water abrasion resistance of the printed portions are excellent.

In the ink of the present embodiment, other water-dispersible resins may be used in combination with the above resins, provided the effects of the present invention are not impaired. Examples of other water-dispersible resins that may be jointly used include aqueous resin emulsions, and particularly oil-in-water (O/W) resin emulsions. A resin that forms a transparent coating is preferably used as the resin used in forming this type of aqueous resin emulsion, and specific examples include ethylene-vinyl chloride copolymer resin emulsions, styrene-maleic anhydride copolymer resin emulsions, vinyl acetate-acrylic copolymer resin emulsions, and vinyl acetate-ethylene copolymer resins emulsions.

(3) Water (Solvent)

There are no particular limitations on the water, provided it can function as a solvent, namely a vehicle, for the ink, and tap water, ion-exchanged water, or deionized water or the like can be used. Water is a highly volatile solvent, and readily evaporates following discharge onto the humidity-conditioning base material, and therefore blocking of the pores of the humidity-conditioning base material following decoration can be prevented, and any deterioration in the humidity-conditioning performance of the decorated humidity-conditioning base material can also be prevented. Further, water is also non-toxic and extremely safe, and does not have the problems associated with VOCs and the like, meaning the decorated humidity-conditioning base material is very environmentally friendly.

The larger the water content in the ink, the greater the effect in preventing deterioration in the humidity-conditioning performance of the humidity-conditioning base material, and therefore the water content is preferably at least 60% by mass, and more preferably 65% by mass or more, of the total mass of the ink. Further, the water content is preferably not more than 95% by mass, and more preferably 90% by mass or less.

The ink solvent is preferably composed almost entirely of water, but may also include water-miscible (water-soluble) organic solvents as necessary. Organic compounds which are liquid at room temperature and can be dissolved in water can be used as the water-miscible organic solvents, and the use of a water-miscible organic solvent which mixes uniformly with an equal volume of water at one atmosphere and 20° C. is preferable. Examples of organic solvents that may be used include lower alcohols having 1 to 6 carbon atoms such as methanol, ethanol, 1-propanol, isopropanol, 1-butanol, 2-butanol, isobutanol and 2-methyl-2-propanol; glycols such as ethylene glycol, diethylene glycol, triethylene glycol, tetraethylene glycol, polyethylene glycol, propylene glycol, dipropylene glycol, tripropylene glycol and polypropylene glycol; glycerols such as glycerol, diglycerol, triglycerol and polyglycerol; acetins such as monoacetin, diacetin and triacetin; glycol ethers such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; as well as triethanolamine, 1-methyl-2-pyrrolidone, 1,3-dimethyl-2-imidazolidinone, β-thiodiglycol and sulfolane. These organic solvents may be used individually, or a mixture containing two or more solvents may be used, provided the solvents form a single phase.

From the viewpoints of viscosity regulation and moisture retention, the amount of water-miscible organic solvents is preferably not more than 30% by mass of the ink (or not more than 50% by mass of the solvent).

(4) Other Components

In addition to the components described above, the ink may optionally include appropriate amounts of wetting agents (humectants), surface tension modifiers (surfactants), antifoaming agents, fixing agents, pH modifiers, antioxidants, and preservatives and the like.

(5) Method for Producing Ink

The ink can be prepared using conventional methods without any particular restrictions. For example, the ink can be prepared by dispersing all of the components in a conventional dispersion device such as a beads mill, either in a single batch or in a number of separate batches, and then, if desired, passing the resulting dispersion through a conventional filtration device such as a membrane filter. For example, the ink can be prepared by first preparing a mixed liquid by uniformly mixing the total amounts of water and the colorant in advance, dispersing this mixed liquid using a dispersion device, subsequently adding the remaining components to the dispersion, and then passing the resulting dispersion through a filtration device.

2. Method for Producing Decorated Humidity-Conditioning Base Material

The method for producing a decorated humidity-conditioning base material according to an embodiment of the present invention comprises a step of performing inkjet printing onto a surface of a humidity-conditioning base material using the aqueous inkjet ink for a humidity-conditioning base material described above.

In this method for producing a decorated humidity-conditioning base material, because printing is performed using the inkjet ink for a humidity-conditioning base material described above, a high-quality image having excellent water abrasion resistance and high gloss can be obtained without impairing the humidity-conditioning performance of the humidity-conditioning base material.

In this embodiment, the production of the decorated humidity-conditioning base material is performed by forming an image on the surface of the humidity-conditioning base material by an inkjet printing method using the ink described above. In this description, the term "decorate" means to ornament, and has the meaning of forming a printed image. Accordingly, the terms "decorated" or "decorative" describe a material having a printed image. This decorative portion may cover the entire surface or a portion of the surface of the target material, namely the humidity-conditioning base material.

The humidity-conditioning base material is preferably a base material having humidity-conditioning performance that satisfies at least grade 1 prescribed for humidity-conditioning construction materials (see Table 1 above). Specifically, the use of a base material that exhibits an amount of moisture adsorption, measured after 3 hours in accordance with JIS A 1470-1 (2002) (or ISO 24353: 2008), that is greater than 15 $g/m^2$ is preferred. Further, the decorated humidity-conditioning base material obtained following the inkjet printing preferably also has humidity-conditioning performance that satisfies at least grade 1 prescribed for humidity-conditioning construction materials, and more specifically, preferably exhibits an amount of moisture adsorption, measured after 3 hours in accordance with JIS A 1470-1 (2002) (or ISO 24353: 2008), that is greater than 15 $g/m^2$.

By performing a pretreatment step of applying and then drying a pretreatment liquid on the surface of the humidity-conditioning base material, prior to performing inkjet printing, the color development and gloss of the image subsequently printed onto the base material by inkjet printing can be improved. Particularly in the case of humidity-conditioning base materials having a low amount of moisture adsorption and desorption and/or a low average moisture content, such as humidity-conditioning construction materials having inferior humidity-conditioning properties and having a low grade as prescribed in JIS A 1470-1 (2002) and/or JIS A 1475 (2004), although a high level of color development can be achieved with even a small amount of ink, if the amount of ink applied per unit of time is increased, then there is a possibility that ink overflow may occur, increasing the likelihood of image bleeding and ink accumulation. This ink accumulation not only causes a deterioration in the image quality, but may also block a portion of the pores within the humidity-conditioning base material, causing a deterioration in the humidity-conditioning performance. In such cases, a pretreatment liquid is preferably applied and then dried on the surface of the humidity-conditioning base material prior to printing.

The pretreatment liquid comprises at least water, a water-dispersible resin, and inorganic particles having a median size of not more than 300 nm, and may also include other optional components. Details relating to each of the components of the pretreatment liquid are described below.

The application of the pretreatment liquid to the surface of the humidity-conditioning base material may be performed by using a brush, roller, bar coater, air knife coater, or sprayer or the like to uniformly coat the surface of the humidity-conditioning base material, or a printing technique such as inkjet printing, gravure printing or flexographic printing may be used to print an image using the pretreatment liquid. In other words, the pretreatment liquid may be applied across the entire surface of the humidity-conditioning base material, or may be applied only to those locations that are required, for example only to those locations onto which inkjet printing is to be performed using the aforementioned ink.

The coating amount of the pretreatment liquid differs depending on the amount of moisture adsorption and desorption and the average moisture content of the humidity-conditioning base material, but in order to achieve a certain level of color development and gloss for the decorative image, the coating amount (non-volatile fraction) is preferably increased for humidity-conditioning base materials having a lower amount of moisture adsorption and desorption and a lower average moisture content. Further, in the case of a humidity-conditioning base material having a surface roughness Ra of about 15 µm, applying a sufficient amount of the pretreatment liquid to achieve an Ra value following the pretreatment of not more than 10 µm, and preferably not more than 8 µm, is desirable in terms of improving the color development and the gloss of the printed image. On the other hand, even if the surface roughness of the humidity-conditioning base material is improved by polishing or the like prior to the pretreatment, there is almost no effect on the pore structure of the base material, and in those cases where the humidity-conditioning base material is to be subjected to a pretreatment with the pretreatment liquid, if the surface is polished or the like prior to the pretreatment to reduce the surface roughness to a value that is preferably not more than 10 µm, and more preferably 8 µm or less, and the pretreatment and subsequent inkjet printing are then performed on the polished surface, then the color development and gloss of the printed image can be improved even further. The surface roughness Ra can be measured using a Laser Scanning Microscope VK-8700 manufactured by Keyence Corporation or the like. During measurement, specific portions such as areas of large surface unevenness or recesses within the humidity-conditioning base material may be excluded.

As mentioned above, the ideal coating amount for the pretreatment liquid differs depending on the humidity-conditioning performance of the humidity-conditioning base material, and can therefore not be uniformly specified, but the non-volatile fraction amount per unit of coated surface area may be set, for example, to about 15 $g/m^2$ to 30 $g/m^2$ in the case of a grade 1 humidity-conditioning construction material, to about 5 $g/m^2$ to 15 $g/m^2$ in the case of a grade 2 humidity-conditioning construction material, and to about 3 $g/m^2$ to 10 $g/m^2$ in the case of a grade 3 humidity-conditioning construction material.

Regardless of whether or not a pretreatment is performed, printing conditions which are useful in obtaining a high-quality decorative image include (i) reducing the size of the ink drops, (ii) reducing the printing speed, (iii) performing unidirectional printing, (iv) performing printing while warming the humidity-conditioning base material, (v) lowering the print resolution, or (vi) using a combination of these printing methods. Particularly in the case of a humidity-conditioning base material that exhibits a low amount of moisture adsorption and desorption and/or a low average moisture content, such as a humidity-conditioning construction material having relatively poor humidity-conditioning properties, and having a low grade as prescribed in the aforementioned humidity-conditioning performance evaluation standards for humidity-conditioning construction materials (for example, a humidity-conditioning construction material of the aforementioned grade 1), bleeding of the image or ink accumulation is likely to occur if a pretreatment is not performed, but by employing the methods described above, image bleeding and ink accumulation can be avoided even if a pretreatment is not conducted.

The printing condition described above in which printing is performed while warming the humidity-conditioning base material is also very effective, regardless of the performance of the humidity-conditioning base material, in those cases where it is necessary to obtain an image of high color development using a small amount of ink, and in those cases where it is desirable to perform uniform printing of a pattern on a humidity-conditioning base material having significant surface unevenness or across a plurality of humidity-conditioning base materials having different ink adsorption performance. By performing printing while warming the humidity-conditioning base material, the components besides water within the ink, such as the pigment, can be formed in positions close to the surface of the humidity-conditioning base material, and therefore the effect on the humidity-conditioning performance and the shape of the humidity-conditioning base material can be minimized, and a stable image can be obtained.

Examples of the method used for warming the humidity-conditioning base material include a method in which the humidity-conditioning base material is heated with a heater until immediately prior to printing, so that the residual heat warms the humidity-conditioning base material during printing, a method in which a sheet-like heater is disposed beneath the humidity-conditioning base material, enabling printing to be performed while the base material is warmed, and a method that uses a combination of these methods. Examples of the heater include ceramic heaters, carbon heaters, and heaters that emit infrared radiation such as a sheath heater that has been subjected to a surface treatment to facilitate the emission of infrared radiation. There are no particular limitations on the heating temperature of the humidity-conditioning base material, provided that the nozzles used for the inkjet printing do not dry out, making the ink discharge unstable.

Following completion of the printing, the humidity-conditioning base material may be subjected to a heating step at a temperature within a range from 50 to 100° C., and the heating method employed may be the same type of method as that mentioned above for use prior to printing or during printing. By heating the humidity-conditioning base material in this manner, the water and other volatile components in the ink can be volatilized completely, while the colorant in the ink can be fixed to the humidity-conditioning base material by the water-dispersible resin.

There are no particular limitations on the humidity-conditioning base material having a humidity-conditioning function used for producing the decorated humidity-conditioning base material, provided the material has a multitude of pores in the surface, and these pores exhibit moisture adsorption and desorption properties. As mentioned above, the use of a base material having a humidity-conditioning function that satisfies at least grade 1 prescribed for humidity-conditioning construction materials is preferable (see Table 1 above). The shape of the humidity-conditioning base material is typically a board shape, namely a sheet-like shape, but is not limited to such shapes.

The diameters of the pores in this humidity-conditioning base material having a humidity-conditioning function are typically from about 1 to 200 nm or about 1 to 100 nm, and more specifically, typically include mesopores having a diameter of 1 to 50 nm and macropores having a diameter exceeding 50 nm (for example, a diameter exceeding 50 nm but not more than 200 nm, or a diameter exceeding 50 nm but not more than 100 nm). The diameter of the mesopores can be measured, for example, by the mercury penetration method using a mercury porosimeter.

Representative examples of the humidity-conditioning base material include hardened bodies of inorganic materials such as calcium silicate, and examples include materials containing inorganic powders having moisture adsorption and desorption capabilities such as silicate powders, silica gel, diatomaceous earth, activated clay, zeolite, bentonite, montmorillonite and sepiolite, as well as materials obtained by additional firing of these hardened bodies. Specific examples of the humidity-conditioning base material include the types of materials used for humidity-conditioning construction materials and the like, and humidity-conditioning construction materials that have been registered with the Japan Construction Material & Housing Equipment Industries Federation are preferred. In other words, humidity-conditioning construction materials having performance levels that satisfy the humidity-conditioning performance evaluation standards listed above in Table 1 can be used particularly favorably. As mentioned above, specific examples of such materials include humidity-conditioning base materials that exhibit an amount of moisture adsorption, measured after 3 hours in accordance with JIS A 1470-1 (2002), that is greater than 15 $g/m^2$.

Examples of such humidity-conditioning construction materials include humidity-conditioning construction materials disclosed in JP 2003-146775 A, obtained by molding one or more hydrophilic materials selected from among gypsum, calcium silicate, cement, gypsum slag and basic magnesium carbonate, humidity-conditioning construction materials obtained by molding a material prepared by adding expanding and/or releasing minerals to one or more of the above hydrophilic materials, and humidity-conditioning construction materials such as those disclosed in JP 2002-4447 A, produced by a carbon dioxide hardening reaction of a molded body containing calcium carbonate and amorphous silica as the main components. Humidity-conditioning construction materials obtained by molding a material containing unexpanded vermiculite blended with calcium silicate, such as the materials disclosed in JP 2003-146775 A, can be used particularly favorably as the humidity-conditioning base material.

Inkjet printing to the above humidity-conditioning base material using the aqueous ink can be performed using a typical inkjet head, and there are no particular limitations on the ink discharge method or the apparatus that is used. By performing drying following the printing (decoration), the water and other volatile components are volatilized from the ink that has been inkjet printed onto the surface of the humidity-conditioning base material, and a humidity-conditioning base material, and in particular a decorative construction material, having humidity-conditioning performance is obtained which includes an image composed mainly of the water-dispersible resin and the colorant. The image on the decorated humidity-conditioning base material may also include, in addition to the water-dispersible resin and the colorant, small amounts of non-volatile components derived from the ink such as surfactants.

In the case of humidity-conditioning construction materials produced by a carbon dioxide hardening reaction, such as the materials disclosed in JP 2002-4447 A, the materials are usually produced via a series of steps comprising: raw material mixing→press molding→carbon dioxide gas hardening (exothermic)→drying, and the decoration step is then performed on the carbon dioxide gas-hardened body, specifically by a series of steps comprising: carbon dioxide gas-hardened body→decorative printing→heating→natural cooling (completion). In one embodiment, the decoration can be performed on the humidity-conditioning construction material, namely on the carbon dioxide gas-hardened body, but in another embodiment, the decoration can be performed on the molded article obtained following press molding but prior to the carbon dioxide gas hardening. In the latter case, the decorative construction material can be produced via the steps of: raw material mixing→press molding→decorative printing→carbon dioxide gas hardening (exothermic)→drying (completion), meaning the heat from the carbon dioxide gas hardening step and the drying step can be used to assist the volatilization of the water and other volatile components within the ink. This offers the advantages that the energy consumption can be kept low, the steps can be shortened, and inventory stock of the material prior to decoration becomes unnecessary.

3. Pretreatment Liquid

Details relating to each of the components of the pretreatment liquid used in the aforementioned pretreatment step are described below.

(1) Water (Solvent)

In the pretreatment liquid, the water functions as the solvent for the pretreatment liquid, and the description of the water provided above in relation to the ink also applies to the pretreatment liquid water. Similarly, the solvent for the pretreatment liquid may also include a water-miscible organic solvent described above in addition to the water.

(2) Inorganic Particles having Median Size of not more than 300 nm)

There are no particular limitations on the inorganic particles, provided they have a median size of not more than 300 nm. If the median size of the inorganic particles exceeds 300 nm, then a state is obtained where the inorganic particles sit on the surface of the humidity-conditioning base material, and therefore the water abrasion resistance of the decorative image deteriorates, or the transparency of the treated portions deteriorates, resulting in a noticeable difference in the external appearance of the pretreated portions and the non-pretreated portions, which is also undesirable.

The median size of the inorganic particles is defined in the same manner as the median size for the water-dispersible resin described above, and the method used for measuring the median size is the same.

The amount (solid fraction amount) of the inorganic particles in the pretreatment liquid is preferably at least 0.8% by mass, and more preferably 1.3% by mass or greater, but is preferably not more than 6.0% by mass, and more preferably 5.4% by mass or less.

In order to further enhance the gloss of the decorative image, the inorganic particles having a median size of not more than 300 nm are preferably composed of a combination of first inorganic particles having a median size that is the same as or greater than the median size of the water-dispersible resin in the ink, and second inorganic particles having a median size that is smaller than the median size of the water-dispersible resin in the ink.

Specifically, the inorganic particles are, for example, preferably composed of a mixture of first inorganic particles of large particle size having a median size of at least 30 nm but not more than 300 nm, and second inorganic particles of small particle size having a median size of less than 30 nm. In those cases where the median size of the water-dispersible resin contained in the ink is smaller than the maximum diameter of the mesopores in the humidity-conditioning base material, the use of a combination of inorganic particles of large particle size and inorganic particles of small particle size is particularly preferred. Moreover, inorganic particles composed of a mixture of first inorganic particles of large particle size having a median size of at least 40 nm but not more than 300 nm, and second inorganic particles of small particle size having a median size of less than 40 nm are also desirable.

These types of mixtures may have bimodal particle size distributions having peaks in a region where the median size is less than 30 nm (or 40 nm), and a region where the median size is between 30 nm (or 40 nm) and 300 nm From the viewpoint of the gloss of the decorative portion, the blend ratio of the first inorganic particles relative to a total value of 100% by mass for the combination of the first inorganic particles and the second inorganic particles is preferably within a range from 5 to 95% by mass, more preferably from 15 to 95% by mass, and most preferably from 50 to 95% by mass.

If the aforementioned inorganic particles are composed only of the first inorganic particles, then the gloss improves compared with the case where no pretreatment is performed, but although the inorganic particles accumulate on the surface of the humidity-conditioning base material, gaps are formed between the inorganic particles that permit the passage of the water-dispersible resin from the ink, meaning that the water-dispersible resin from the ink is still able to enter the mesopores, resulting in a slightly inferior improvement in the gloss. On the other hand, if the inorganic particles are composed only of the second inorganic particles, then the gloss improves compared with the case where no pretreatment is performed, but although the types of gaps described above are not formed between the inorganic particles accumulated on the humidity-conditioning base material, the inorganic particles themselves are able to enter the mesopores, resulting in a slightly inferior improvement in the gloss. In contrast, if, as described above, the inorganic particles are composed of first inorganic particles having a median size of at least 40 nm but not more than 300 nm, and second inorganic particles having a median size of less than 40 nm, then the improvement in the gloss is excellent, and this configuration is useful in those cases where the median size of the water-dispersible resin contained in the ink is smaller than the maximum diameter of the aforementioned mesopores, and particularly when the median size of the water-dispersible resin contained in the ink is about 40 nm. In a separate embodiment, for example when the median size of the water-dispersible resin contained in the ink is about 25 nm to 30 nm, the inorganic particles are preferably composed of first inorganic particles having a median size of at least 30 nm but not more than 300 nm, and second inorganic particles having a median size of less than 30 nm.

Examples of the inorganic particles include silica fine particles, vermiculite, calcium carbonate and alumina, and among these, silica fine particles are preferred. Further, extenders such as talc, diatomaceous earth, calcium carbonate, barium carbonate, barium sulfate, alumina white, silica, kaolin, mica, acid clay, activated clay and bentonite can also be used favorably. Combinations containing a plurality of these inorganic particles may also be used.

(3) Water-Dispersible Resin

In the pretreatment liquid, the water-dispersible resin is added to ensure satisfactory fixation to the humidity-conditioning base material of the aforementioned inorganic particles having a median size of not more than 300 nm. There are no particular limitations on the water-dispersible resin, provided the resin exhibits water resistance and adhesion to the humidity-conditioning base material, and specific examples of resins that may be used include the various water-dispersible resins described above as being suitable for use in combination with the water-dispersible urethane resin and the like in the ink. A combination of a plurality of water-dispersible resins may also be used.

Although there are no particular limitations on the median size of the water-dispersible resin in the pretreatment liquid, the median size is preferably greater than the diameter of the mesopores in the humidity-conditioning base material that is to be decorated, and more specifically, is preferably greater than 40 nm, more preferably 45 nm or greater, still more preferably 80 nm or greater, and most preferably 150 nm or greater. Because the water-dispersible resin contained in the pretreatment liquid is required to achieve favorable binding between the inorganic particles and between the inorganic particles and the humidity-conditioning base material, without entering the mesopores of the humidity-conditioning base material, the median size of the water-dispersible resin contained in the pretreatment liquid is preferably larger than the diameter of the aforementioned mesopores.

The amount of the water-dispersible resin within the pretreatment liquid, reported as a ratio between the inorganic particles and the water-dispersible resin (namely, inorganic particles: water-dispersible resin), is preferably within a range from 15:1 to 25:1 (mass ratio). By ensuring that the amount of the water-dispersible resin satisfies this range, the inorganic particles can be fixed satisfactorily to the humidity-conditioning base material.

The amount of the water-dispersible resin contained in the pretreatment liquid is preferably less than the amount of the water-dispersible resin in the ink.

(4) Other Components

Components other than those described above may also be added to the pretreatment liquid, provided they have no adverse effects on the properties of the pretreatment liquid, and examples of these other components include humectants, antifoaming agents, pH modifiers, antioxidants and preservatives.

(5) Method for Producing Pretreatment Liquid

The pretreatment liquid can be prepared, for example, by dispersing all of the components, including the water, the water-dispersible resin and the inorganic particles having a median size of not more than 300 nm, in a conventional dispersion device such as a beads mill, either in a single batch or in a number of separate batches, and then, if desired, passing the resulting dispersion through a conventional filtration device such as a membrane filter. For example, the pretreatment liquid can be prepared by first preparing a mixed liquid by uniformly mixing the total amounts of water and the inorganic particles in advance, dispersing this mixed liquid using a dispersion device, subsequently adding the remaining components to the dispersion, and then passing the resulting dispersion through a filtration device.

4. Another Embodiments

Another embodiment of the present invention relates to a use of an aqueous inkjet ink for decorating a humidity-conditioning base material. Details of the ink and the base material are as described above.

Yet another embodiment of the present invention relates to a decorated humidity-conditioning base material (decorative article) comprising a decorative portion formed using the aqueous inkjet ink for a humidity-conditioning base material according to the embodiment of the present invention. The decorated humidity-conditioning base material preferably has an amount of moisture adsorption, measured after 3 hours in accordance with JIS A 1470-1 (2002), of greater than 15 g/m$^2$. The decorative article is, for example, preferably a humidity-conditioning construction material, but besides construction materials, may also be a coaster or a foot mat or the like.

The image formed by inkjet printing is preferably formed on the surface of "a porous material" or "a porous base material" that has been surface treated in advance with the special pretreatment liquid described above, namely coated with the pretreatment liquid.

There are no particular limitations on the recording surface area of the image, and any arbitrary pattern, text, or combination of pattern and text can be freely selected.

EXAMPLES

The present invention is described below in further detail using a series of examples, but the present invention is in no way limited by these examples.

1. Preparation of Aqueous Inkjet Inks

For each ink, the components shown in Table 2 were premixed in the proportions (mass %) shown in the table and were then dispersed for one minute using a homogenizer, and the thus obtained dispersions were each filtered through a membrane filter with a pore size of 3 μm, thus obtaining a series of inks 1 to 9.

TABLE 2

| | | Non-volatile fraction (mass %) | Ink 1 | Ink 2 | Ink 3 | Ink 4 | Ink 5 | Ink 6 | Ink 7 | Ink 8 | Ink 9 | Ink 10 | Ink 11 |
|---|---|---|---|---|---|---|---|---|---|---|---|---|---|
| Pigment dispersion | Pigment dispersion 1 | 13 | 46.2 | 46.2 | 46.2 | 46.2 | 46.2 | 46.2 | 46.2 | 46.2 | 46.2 | 46.2 | 46.2 |
| Water-dispersible resin | Urethane resin emulsion 1 | 33 | 3.4 | 6.8 | 10.1 | 6.8 | — | — | — | 0.3 | 13.5 | 13.5 | — |
| | Urethane resin emulsion 2 | 38 | — | — | — | — | 5.9 | — | 5.9 | — | — | — | — |
| | Urethane resin emulsion 3 | 40 | — | — | — | — | — | 5.6 | — | — | — | — | 11.3 |
| | Acrylic resin emulsion 1 | 40 | — | — | — | — | — | 5.6 | — | 5.6 | — | — | — |
| | Styrene/acrylic resin emulsion 1 | 55 | — | — | — | — | — | — | 4.1 | — | — | — | — |

TABLE 2-continued

| | | Non-volatile fraction (mass %) | Ink 1 | Ink 2 | Ink 3 | Ink 4 | Ink 5 | Ink 6 | Ink 7 | Ink 8 | Ink 9 | Ink 10 | Ink 11 |
|---|---|---|---|---|---|---|---|---|---|---|---|---|---|
| | Styrene/acrylic resin emulsion 2 | 45 | 7.5 | 5.0 | 2.5 | — | 5.0 | — | — | — | 10.0 | — | — |
| | Styrene/acrylic resin emulsion 3 | 45 | — | — | — | 5.0 | — | — | — | — | — | — | — |
| Surfactant | Surfactant 1 | | 3.0 | 3.0 | 3.0 | 3.0 | 3.0 | 3.0 | 3.0 | 3.0 | 3.0 | 3.0 | 3.0 |
| Water-miscible organic solvent | Water-miscible organic solvent 1 | | 20.0 | 20.0 | 20.0 | 20.0 | 20.0 | 20.0 | 20.0 | 20.0 | 20.0 | 20.0 | 20.0 |
| | Water | | 19.9 | 19.0 | 18.2 | 19.0 | 19.9 | 19.6 | 20.8 | 24.9 | 7.3 | 17.3 | 19.5 |
| | Total | | 100.0 | 100.0 | 100.0 | 100.0 | 100.0 | 100.0 | 100.0 | 100.0 | 100.0 | 100.0 | 100.0 |
| | Pigment:water-dispersible resin | | 1:0.75 | 1:0.75 | 1:0.75 | 1:0.75 | 1:0.75 | 1:0.75 | 1:0.75 | 1:0.75 | 1:1.5 | 1:0.75 | 1:0.75 |
| | Proportion of water-dispersible acrylic resin or water-dispersible styrene/acrylic resin relative to total amount of water-dispersible resins | | 0.75 | 0.50 | 0.25 | 0.50 | 0.50 | 0.50 | 0.50 | 0.95 | 0.50 | 0.00 | 0.00 |

Details relating to the various components shown in Table 2 are as follows.

(1) Pigment Dispersion

Pigment dispersion 1: BONJET BLACK CW-4 (a self-dispersible carbon black dispersion, manufactured by Orient Chemical Industries, Ltd.).

(2) Water-dispersible Resins

Urethane resin emulsion 1: ADEKA BONTIGHTER HUX370 (manufactured by ADEKA Corporation, median size: 10 nm).

Urethane resin emulsion 2: SUPERFLEX 150HS (manufactured by DKS Co., Ltd., median size: 83 nm).

Urethane resin emulsion 3: SUPERFLEX 740 (manufactured by DKS Co., Ltd., median size: 170 nm).

Acrylic resin emulsion 1: MOWINYL 6969D (manufactured by The Nippon Synthetic Chemical Industry Co., Ltd., median size: 113 nm).

Styrene/acrylic resin emulsion 1: JONCRYL PDX-7370 (manufactured by BASF Corporation, median size: 77 nm).

Styrene/acrylic resin emulsion 2: MOWINYL 966A (manufactured by The Nippon Synthetic Chemical Industry Co., Ltd., median size: 169 nm).

Styrene/acrylic resin emulsion 3: MOWINYL 6963 (manufactured by The Nippon Synthetic Chemical Industry Co., Ltd., median size: 164 nm).

The average particle size of each resin was measured using the dynamic light scattering particle size distribution measuring apparatus "Nanoparticle Analyzer nano Partica SZ-100" (manufactured by Horiba, Ltd.), by diluting each resin dispersion with purified water to achieve a particle concentration of 0.5% by mass, and then determining the median size in a volumetric distribution measured at a temperature of 25° C. under settings including a dispersion medium refractive index of 1.333 and a sample refractive index of 1.600, and with the distribution morphology set to "polydispersity" and "narrow".

(3) Surfactant

Surfactant 1: SURFYNOL 465 (an acetylene glycol-based surfactant, manufactured by Nissin Chemical Co., Ltd.).

(4) Water-Miscible Organic Solvent

Water-miscible organic solvent 1: glycerol (special grade reagent, manufactured by Wako Pure Chemical Industries, Ltd.).

2. Preparation of Pretreatment Liquids

For each pretreatment liquid, the components shown in Table 3 were premixed in the proportions (mass %) shown in the table, and were then dispersed for one minute using an ultrasonic dispersion device, thus obtaining pretreatment liquids 1 and 2.

TABLE 3

| | | Non-volatile fraction (mass %) | Pretreatment liquid 1 | Pretreatment liquid 2 |
|---|---|---|---|---|
| Inorganic particles | Inorganic particles 1 | 100 | 7.5 | — |
| | Inorganic particles 2 | 30 | — | 12.5 |
| | Inorganic particles 3 | 40 | — | 9.4 |
| Water-dispersible resin | Water-dispersible resin 1 | 50 | 0.8 | 0.8 |
| | Water | | 91.7 | 77.3 |
| | Total | | 100 | 100 |
| | Mass ratio (first inorganic particles/second inorganic particles) | | 100/0 | 50/50 |

Details relating to each of the components shown in Table 3 are as follows.

(1) Inorganic Particles

Inorganic particles 1: AEROSIL OX-50 (a hydrophilic fumed silica, manufactured by Nippon Aerosil Co., Ltd., median size: 40 nm).

Inorganic particles 2: SNOWTEX MP-2040 (a colloidal silica, manufactured by Nissan Chemical Industries, Ltd., median size: 170 to 230 nm, 40% aqueous dispersion).

Inorganic particles 3: SNOWTEX 30 (a colloidal silica, manufactured by Nissan Chemical Industries, Ltd., median size: 10 to 15 nm, 30% aqueous dispersion).

(2) Water-dispersible Resin

Water-dispersible resin 1: SUMIELITE 1010 (an ethylene-vinyl chloride copolymer resin emulsion, manufactured by Sumika Chemtex Co., Ltd., median size: 200 nm).

3. Examples 1 to 11, Comparative Examples 1 to 3

Each of the prepared inks 1 to 11 was installed in a commercially available inkjet printer (MMP845H manufactured by MasterMind Inc.), and a monochromatic image including a solid printing region as well as text and fine lines was printed onto a humidity-conditioning construction material "MOISS" (a product name, a material for which the amount of water adsorption and desorption and the equilibrium moisture content prescribed in the humidity-conditioning performance evaluation standards both satisfy grade 3) manufactured by Mitsubishi Materials Kenzai Corporation. Following completion of the printing, the material was heated for 130 seconds on a 70° C. sheet heater, and then subjected to the following evaluations. Further in those cases where a pretreatment was performed (all cases other than Example 1 and Comparative Example 1), the pretreatment liquid 1 or 2 was applied across the entire surface of the MOISS material using a commercially available air sprayer, with a wet coating amount of 78 g/m$^2$ (a solid fraction amount of about 6.2 g/m$^2$), and following heating for 130 seconds on a 70° C. sheet heater, the material was then printed using the method described above.

The UV ink of Comparative Example 1 was an ECO-UV ink designed for use in a UV printer VersaUV LEF-12 manufactured by Roland DG Corporation, and following printing to the MOISS material using this printer, the ink was cured by ultraviolet radiation from the UV-LED lamp housed inside the printer.

4. Evaluations (1) Objective Visual Evaluation (Evaluation of Image Density and Bleeding)

The image printed on the humidity-conditioning base material was inspected visually, and the image density and bleeding (lack of blurring) were evaluated against the following criteria.

A: density and bleeding were both good, an extremely good image representation.

B: density and bleeding were both good, a good image representation.

C: slight problems in terms of the density or bleeding.

D: image representation was not possible.

(2) Gloss of Decorative Portion

The 60° gloss value of the surface of the image printed on the humidity-conditioning base material was measured using a Multi-Gloss 268 (product name) manufactured by Konica Minolta, Inc., and compared with the value for the humidity-conditioning construction material prior to decoration (the raw material).

A: gloss was much higher than that of the raw material.

B: gloss was higher than that of the raw material.

C: gloss was similar to that of the raw material

D: image representation was not possible.

(3) Performance Evaluation of Decorated Humidity-Conditioning Base Material

For each of the decorated humidity-conditioning base materials, the amount of moisture adsorption and desorption prescribed in JIS A 1470-1 and the equilibrium moisture content prescribed in JIS A 1475 were measured and evaluated against the following criteria.

A: the grade was maintained for all items.

D: the grade decreased for one or more items.

(4) Evaluation of Water Abrasion Resistance of Printed Image

The image printed on the humidity-conditioning base material was rubbed with a wet sponge and evaluated against the following criteria.

A: the image was not removed even after 30 or more wet sponge rubbing repetitions.

B: the image was removed after 20 or more but less than 30 wet sponge rubbing repetitions.

C: the image was removed after 10 or more but less than 20 wet sponge rubbing repetitions.

D: the image was removed after less than 10 wet sponge rubbing repetitions.

TABLE 4

|  |  | Example 1 | Example 2 | Example 3 | Example 4 | Example 5 | Example 6 | Example 7 |
|---|---|---|---|---|---|---|---|---|
| Ink |  | Ink 1 | Ink 1 | Ink 1 | Ink 2 | Ink 3 | Ink 4 | Ink 5 |
| Pretreatment liquid |  | none | pretreatment liquid 1 | pretreatment liquid 2 | pretreatment liquid 2 | pretreatment liquid 2 | pretreatment liquid 2 | pretreatment liquid 2 |
| Evaluation results | Objective visual evaluation | B | A | A | A | A | A | A |
|  | Gloss | C | B | A | A | A | A | A |
|  | Humidity-conditioning performance | A | A | A | A | A | A | A |
|  | Water abrasion resistance | B | A | A | A | A | A | A |

|  |  | Example 8 | Example 9 | Example 10 | Example 11 | Comparative Example 1 | Comparative Example 2 | Comparative Example 3 |
|---|---|---|---|---|---|---|---|---|
| Ink |  | Ink 6 | Ink 7 | Ink 8 | Ink 9 | UV ink | Ink 10 | Ink 11 |
| Pretreatment liquid |  | pretreatment liquid 2 | pretreatment liquid 2 | pretreatment liquid 2 | pretreatment liquid 2 | none | pretreatment liquid 2 | pretreatment liquid 2 |

TABLE 4-continued

| Evaluation results | | | | | | | | |
|---|---|---|---|---|---|---|---|---|
| | Objective visual evaluation | A | A | A | A | C | C | C |
| | Gloss | A | A | A | A | D | C | D |
| | Humidity-conditioning performance | A | A | A | A | D | A | A |
| | Water abrasion resistance | A | A | B | A | D | C | D |

Based on Table 4, it is evident that Examples 1 to 11 yielded favorable results in all of the evaluations. In contrast, none of Comparative Examples 1 to 3 was able to produce good results for all of the evaluations at the same time.

It is to be noted that, besides those already mentioned above, many modifications and variations of the above embodiments may be made without departing from the novel and advantageous features of the present invention. Accordingly, all such modifications and variations are intended to be included within the scope of the appended claims.

The entire contents of JP 2003-146775 A, JP 2002-4447 A, JIS A 1470-1:2002, and JIS A 1475:2004 are incorporated by reference herein.

The invention claimed is:

1. A method for producing a decorated humidity-conditioning base material, comprising:
    performing inkjet printing onto a surface of a humidity-conditioning base material comprising a humidity-conditioning construction material, using an aqueous inkjet ink for a humidity-conditioning base material, wherein the ink comprises at least a colorant, a water-dispersible resin and water, and the water-dispersible resin comprising at least one water-dispersible urethane resin and at least one water-dispersible (meth)acrylic resin or water-dispersible styrene/(meth)acrylic resin,
    the humidity-conditioning base material exhibiting an amount of moisture adsorption, measured after three hours in accordance with JIS A 1470-1 (2002) that is greater than 15 g/m$^2$.

2. The method according to claim 1, wherein a median size of the water-dispersible urethane resin particles is from 10 to 200 nm.

3. The method according to claim 1, wherein a median size of the water-dispersible (meth)acrylic resin or water-dispersible styrene/(meth)acrylic resin is from 10 to 200 nm.

4. The method according to claim 1, wherein a median size of the water-dispersible urethane resin particles is from 10 to 200 nm, and a median size of the water-dispersible (meth)acrylic resin or water-dispersible styrene/(meth)acrylic resin is from 10 to 200 nm.

5. The method according to claim 1, wherein an amount of the water-dispersible (meth)acrylic resin or water-dispersible styrene/(meth)acrylic resin represents 20 to 90% by mass of a total mass of water-dispersible resins.

6. The method according to claim 1, comprising prior to performing inkjet printing onto the surface of the humidity-conditioning base material a pretreatment of applying a pretreatment liquid containing at least water, a water-dispersible resin having a median size that is greater than 40 nm, and inorganic particles having a median size of not more than 300 nm to a surface of the humidity-conditioning base material.

7. The method according to claim 1, wherein the humidity-conditioning base material comprises a hardened body of an inorganic material.

8. The method according to claim 7, wherein the inorganic material comprises at least one selected from the group consisting of silicate powder, silica gel, diatomaceous earth, activated clay, zeolite, bentonite, montmorillonite and sepiolite.

9. The method according to claim 1, wherein the humidity-conditioning construction material is obtained by molding one or more hydrophilic materials selected from among gypsum, calcium silicate, cement, gypsum slag and basic magnesium carbonate; the humidity-conditioning construction material is obtained by molding a material prepared by adding expanding and/or releasing minerals to one or more of the hydrophilic materials; or the humidity-conditioning construction material is produced by a carbon dioxide hardening reaction of a molded body containing calcium carbonate and amorphous silica as main components.

10. A decorated humidity-conditioning base material comprising:
    a humidity-conditioning base material comprising a humidity-conditioning construction material; and
    a decorative portion formed using an aqueous inkjet ink for a humidity-conditioning base material, the ink comprising at least a colorant, a water-dispersible resin and water, and the water-dispersible resin comprising at least one water-dispersible urethane resin and at least one water-dispersible (meth)acrylic resin or water-dispersible styrene/(meth)acrylic resin, and
    the decorated humidity-conditioning base material having an amount of moisture adsorption, measured after 3 hours in accordance with JIS A 1470-1 (2002), of greater than 15 g/m$^2$.

11. The decorated humidity-conditioning base material according to claim 10, wherein the humidity-conditioning base material comprises a hardened body of an inorganic material.

12. The decorated humidity-conditioning base material according to claim 11, wherein the inorganic material comprises at least one selected from the group consisting of silicate powder, silica gel, diatomaceous earth, activated clay, zeolite, bentonite, montmorillonite and sepiolite.

13. The decorated humidity-conditioning base material according to claim 10, wherein the humidity-conditioning construction material is obtained by molding one or more hydrophilic materials selected from among gypsum, calcium silicate, cement, gypsum slag, and basic magnesium carbonate; the humidity-conditioning construction material is obtained by molding a material prepared by adding expanding and/or releasing minerals to one or more of the hydrophilic materials; or the humidity-conditioning construction material is produced by a carbon dioxide hardening reaction of a molded body containing calcium carbonate and amorphous silica as main components.

* * * * *